(12) United States Patent
Thilagar et al.

(10) Patent No.: US 9,507,880 B2
(45) Date of Patent: Nov. 29, 2016

(54) REGULAR EXPRESSION OPTIMIZER

(75) Inventors: Parthiban Thilagar, Hollis, NH (US);
Richard J. Anderson, Jr., Nashua, NH (US); William A. Wright, Bedford, NH (US); Joseph E. Errede, Londonderry, NH (US); Patrick H. Fry, Brookline, NH (US); Raymond L. Pfau, Bolton, MA (US); Michael J. Skarpelos, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 341 days.

(21) Appl. No.: 12/857,636

(22) Filed: Aug. 17, 2010

(65) Prior Publication Data
US 2012/0005184 A1    Jan. 5, 2012

Related U.S. Application Data

(60) Provisional application No. 61/359,913, filed on Jun. 30, 2010.

(51) Int. Cl.
*G06F 17/30* (2006.01)

(52) U.S. Cl.
CPC ............... *G06F 17/30979* (2013.01)

(58) Field of Classification Search
CPC ............... G06F 17/30; G06F 17/00
See application file for complete search history.

(56) References Cited

U.S. PATENT DOCUMENTS

| 3,568,156 | A | * | 3/1971 | Thompson | |
| 4,550,436 | A | * | 10/1985 | Freeman et al. | 382/218 |
| 5,224,040 | A | * | 6/1993 | Tou | 704/2 |
| 5,299,206 | A | * | 3/1994 | Beaverson et al. | 714/724 |
| 5,548,719 | A | * | 8/1996 | DeVane et al. | 714/39 |
| 6,202,064 | B1 | * | 3/2001 | Julliard | |
| 6,373,971 | B1 | * | 4/2002 | Floratos et al. | 382/129 |
| 6,681,217 | B1 | * | 1/2004 | Lewak | 707/706 |
| 6,715,107 | B2 | * | 3/2004 | Beer et al. | 714/37 |
| 6,754,650 | B2 | * | 6/2004 | Cho et al. | |
| 6,892,237 | B1 | * | 5/2005 | Gai et al. | 709/224 |
| 6,996,562 | B2 | * | 2/2006 | Finkelstein | |
| 7,093,023 | B2 | * | 8/2006 | Lockwood et al. | 709/231 |
| 7,119,577 | B2 | * | 10/2006 | Sharangpani | 326/46 |
| 7,180,895 | B2 | * | 2/2007 | Smith | 370/394 |
| 7,209,913 | B2 | * | 4/2007 | Megiddo et al. | 707/706 |
| 7,254,632 | B2 | * | 8/2007 | Zeira et al. | 709/224 |
| 7,260,558 | B1 | * | 8/2007 | Cheng et al. | 706/12 |
| 7,295,965 | B2 | * | 11/2007 | Haigh et al. | 704/9 |
| 7,305,391 | B2 | | 12/2007 | Wyschogrod et al. | |
| 7,308,446 | B1 | | 12/2007 | Panigrahy et al. | |
| 7,386,548 | B2 | * | 6/2008 | Finkelstein | |
| 7,412,443 | B2 | * | 8/2008 | Finkelstein | |

(Continued)

OTHER PUBLICATIONS

Fernandez, Mary, and Dan Suciu. "Optimizing regular path expressions using graph schemas." Data Engineering, 1998. Proceedings., 14th International Conference on. IEEE, 1998, pp. 14-23 (10 total pages).*

(Continued)

*Primary Examiner* — Farhan Syed
(74) *Attorney, Agent, or Firm* — Kraguljac Law Group, LLC (57) ABSTRACT

Systems, methods, and other embodiments associated with processing regular expressions are described. One example method includes analyzing a rule for a regular expression and deleting the regular expression.

18 Claims, 3 Drawing Sheets

(56) References Cited

U.S. PATENT DOCUMENTS

| | | | |
|---|---|---|---|
| 7,499,941 B2 | 3/2009 | Michaeli et al. | |
| 7,636,716 B1* | 12/2009 | Cheng | G06F 17/30707 |
| | | | 717/141 |
| 7,656,716 B1* | 2/2010 | Srinivasan | G11C 15/00 |
| | | | 365/189.02 |
| 7,685,254 B2* | 3/2010 | Pandya | 709/217 |
| 7,689,530 B1 | 3/2010 | Williams, Jr. et al. | |
| 7,702,629 B2 | 4/2010 | Cytron et al. | |
| 7,774,144 B2* | 8/2010 | Bogoch et al. | 702/19 |
| 7,827,190 B2* | 11/2010 | Pandya | 707/758 |
| 7,916,510 B1* | 3/2011 | Starovoitov | G06F 17/30985 |
| | | | 365/49.1 |
| 8,589,436 B2* | 11/2013 | Srinivasan | G06K 9/62 |
| | | | 707/780 |
| 2003/0163803 A1* | 8/2003 | Wyschogrod | G06F 8/427 |
| | | | 717/141 |
| 2004/0193596 A1* | 9/2004 | Defelice | G06F 17/30719 |
| 2005/0080763 A1* | 4/2005 | Opatowski | G06F 17/30985 |
| 2005/0273450 A1* | 12/2005 | McMillen | G06K 9/00973 |
| 2006/0167873 A1* | 7/2006 | Degenaro | G06F 9/45512 |
| 2006/0195297 A1* | 8/2006 | Kubota | G06F 17/30861 |
| | | | 702/187 |
| 2006/0230071 A1* | 10/2006 | Kass | G06F 17/30539 |
| 2007/0088751 A1* | 4/2007 | DeFelice | G06F 17/30011 |
| 2007/0100818 A1* | 5/2007 | DeFelice | G06F 17/30011 |
| 2007/0250829 A1* | 10/2007 | Hillier | H04L 41/022 |
| | | | 717/170 |
| 2007/0282833 A1* | 12/2007 | McMillen | H04L 63/145 |
| 2008/0086363 A1* | 4/2008 | Kass | G06Q 10/04 |
| | | | 705/7.29 |
| 2008/0295069 A1* | 11/2008 | Nicholls | G06F 8/76 |
| | | | 717/106 |
| 2009/0083265 A1 | 3/2009 | Michailov | |
| 2009/0192965 A1* | 7/2009 | Kass | G06F 17/30539 |
| | | | 706/46 |
| 2010/0057663 A1* | 3/2010 | Srinivasan | G06K 9/62 |
| | | | 706/52 |
| 2010/0057735 A1* | 3/2010 | Srinivasan | G06K 9/62 |
| | | | 707/E17.014 |
| 2010/0057736 A1 | 3/2010 | Srinivasan et al. | |

OTHER PUBLICATIONS

Calvanese, Diego, et al. "Rewriting of regular expressions and regular path queries." Proceedings of the eighteenth ACM SIGMOD-SIGACT-SIGART symposium on Principles of database systems. ACM, 1999, pp. 194-204 (11 total pages).*

Goyvaerts, Jan. Regular Expressions: The Complete Tutorial. Lulu Press, 2006, pp. i-192 (197 total pages).*

Bispo, Joao, Ioannis Sourdis, Joao MP Cardoso, and Stamatis Vassiliadis. "Regular expression matching for reconfigurable packet inspection." In Field Programmable Technology, 2006. FPT 2006. IEEE International Conference on, pp. 119-126. IEEE, 2006.*

"The Open Group Base Specifications Issue 6", IEEE Std 1003.1, 2004 Edition, printed on Jun. 25, 2010 from http://www.opengroup.org/onlinepubs/009695399/basedefs/ebd_chap . . . (15 pgs).

* cited by examiner

REGULAR EXPRESSION OPTIMIZER

CROSS REFERENCE TO RELATED APPLICATIONS

This disclosure claims the benefit of U.S. Provisional Patent Application Ser. No. 61/359,913; entitled "Regular Expression Optimizer"; filed Jun. 30, 2010, which is hereby incorporated by reference in its entirety.

BACKGROUND

Regular expressions provide a powerful method for finding a search string within another target string, file or stream of text data such as a web document. Regular expressions are particularly useful for searching for patterns in semi-structured text data. Regular expressions are also useful for finding specific HTTP header values or specific web page content.

Regular expressions are very powerful but difficult to use. For example, expressions do not always do what a user intended; either it is too simple and produces unintended results or it is too complex and is impossible to determine whether or not the expression is correct. Another difficulty that may occur is that a user cannot easily determine what the regular expression actually did. This is due to how the regular expression search engine operates. The search engine performs a matching operation and comparison against a target string buffer or file. The result is either a match or a no match value (e.g. Boolean "found" or "not found"). The search results do not indicate "what" was found and the search engine does not retrieve the actual objects that match. Another difficulty is that regular expression execution is normally very expensive and resource intensive as compared to other search mechanisms, such as "substring" searches.

Previous ways to manage regular expressions relied on the experience of a user. For example, to improve search performance, the user needed to manually program and change their regular expressions using more complex expressions. However as expression complexity increased, the ability for the user to determine whether or not the expression is working correctly decreased, which brought up the original dilemma. Also, as expression complexity increases, execution duration and resource consumption typically increase.

Users that provide regular expressions often use the syntax incorrectly. This causes a mistake in what the user is asking for but not an error in the syntax. The regular expression search engine that processes the regular expression cannot tell if the mistake was intentional or not and often results in a larger amount of processing operations than is necessary and/or produce incorrect results.

BRIEF DESCRIPTION OF THE DRAWINGS

The accompanying drawings, which are incorporated in and constitute a part of the specification, illustrate various systems, methods, and other embodiments. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems, methods, media, and other embodiments are described that relate to processing rules or search requests that are formed using regular expressions. In one embodiment, a rule is modified to transform the regular expression to a more manageable expression (e.g. uses less executable operations) but still produces the same result. In one embodiment, certain types of regular expressions are eliminated, or modified to replace the original regular expression with an equivalent alternative that is more efficient. In some embodiments, certain regular expressions are converted to a simpler substring search and execution of a regular expression search engine is avoided.

In one embodiment, a method is provided for intercepting user-supplied regular expressions and performing systematic pre-processing on the expressions to transform/modify the regular expression. For example, greedy quantifiers can either be completely eliminated, or deleted and replaced with lazy quantifiers. In one embodiment, the system produces text search operations (not a regular expression search) that provide faster results identical to executing the original regular expression. The modifications provide for more CPU-efficient search operations, which in turn provides better response time characteristics.

In another embodiment, a cache system is provided. This is described in more detail with reference to FIG. 3. A user (e.g. a system administrator of the cache) can specify what content they wish to cache by identifying matching string patterns in regular expression(s). Contents of filenames that match the string patterns are then cached. For example, the cache system is a web cache server that is configured to cache specified content/objects that are retrieved from content sources. Pre-determined rules created with regular expressions are used to match incoming requests to determine cacheable or non-cacheable objects based on the rule(s). When clients (e.g. users trying to access web content via browsers or other client devices) are frequently requesting a particular type of content (e.g. a video, a news article, and so on), the system administrator can define a regular expression that tells the cache system what content to cache. Thus the cached content can be returned to requesting clients more quickly rather than having to retrieve the same content from its source over-and-over. Prior to executing the regular expression(s), the system analyzes the regular expression(s) to determine whether to convert or modify the expression to a simpler form. In this manner, the rules are executed more efficiently.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, instructions stored in a non-transitory computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"User", as used herein, includes but is not limited to one or more persons, software, computers or other devices, or combinations of these.

Overview of Regular Expression Language

The following is a very brief overview of the regular expression language and some of its syntax. It is for the purpose of understanding some concepts or examples in this disclosure and not for limiting the scope in any way.

Some regular expressions match only one string; an expression has only one matching result. For example, the regular expression "foo" matches the string "foo" and no others. Other regular expressions match more than one string, i.e., the set they describe has more than one result. For example, the regular expression "x*" matches the set of strings made up of any number (including zero) of "x" characters. Some characters in regular expressions represent literal characters that match themselves (such as the character "x"). The characters that don't match themselves (such as the character "*") represent directives that let a rule specify patterns that describe many different strings. These rules are defined in the regular expression language as part of several standards.

In one embodiment, the term "search engine" in this discussion does not refer to internet search engines, such as Google or Yahoo. Rather, regular expression search engines are the underlying software that interpret the supplied regular expressions and perform the actual comparison against a target string buffer or file. Thus, a user-specified "regular expression" is supplied to a search engine for execution, with the result that either a match is identified or is rejected (e.g. a Boolean result is outputted).

The term "greedy" means the expression matches as much as possible, while the term "lazy" or "non-greedy" means the expression matches the minimum possible. A third kind of quantifier is known as a "possessive" quantifier. The "greedy" and "lazy" quantifiers determine the order in which the regular expression search engine will try the possible permutations of the regular expression pattern. A "greedy" quantifier such as "*" will first try to repeat the token as many times as possible, and gradually give up matches as the engine backtracks to find an overall match.

A lazy quantifier such as "*?" will first repeat the token as few times as required, and gradually expand the search as the engine backtracks through the regular expression pattern to find an overall match. Because the "greedy" and "lazy" quantifiers change the order in which permutations are tried, they can change the overall regular expression search result. However, they do not change the fact that the regular expression search engine will backtrack to try all possible permutations of the regular expression in case no match can be found.

Possessive quantifiers such as "*+" are a way to prevent the regular expression search engine from backtracking and trying all permutations. They are used primarily to improve search performance by eliminating the backtracking operations. Refer to the IEEE regular expression standards documents for full disclosure of the regular expression language and syntax.

Special Characters Used as Directives

? (question mark) Makes the preceding expression optional. This quantifier is greedy, so a match is found with or without the optional expression. For example, the expression "abc?" matches either "ab" or "abc". Another example is that the expression "colou?r" matches both "color" and "colour".

?? Makes the preceding expression optional. This quantifier is lazy, so the optional expression is *excluded* in the match if possible. This construct is often excluded from documentation because of its limited use and potential misuse. The expression "abc??" matches "ab" or "abc".

* (asterisk or star) repeatedly matches the previous item zero or more times. This quantifier is greedy, so as many items as possible are matched before trying permutations with less matches of the preceding item, up to the point where the preceding item is not matched at all. The expression "x.*x" matches "xdefx xghix" (but not "xdefx") in the string "abc xdefx xghix jkl".

*? (lazy asterisk) repeatedly matches the previous item zero or more times. This quantifier is lazy, so the engine first attempts to skip the previous item, before trying permutations with ever increasing matches of the preceding item. The expression "x.*?x" matches "xdefx" (but not "xdefx xghix") in the string "abc xdefx xghix jkl".

+ (plus) repeatedly matches the previous item once or more. This quantifier is greedy, so as many items as possible will be matched before trying permutations with less matches of the preceding item, up to the point where the preceding item is matched only once. "x.+x" matches "xdefx xghix" in the string "abc xdefx xghix jkl".

+? (lazy plus) repeatedly matches the previous item once or more. This quantifier is lazy, so the engine first matches the previous item only once, before trying permutations with ever increasing matches of the preceding item. The expression "x.+?x" matches "xdefx" in the string "abc xdefx xghix jkl".

^ (leading anchor) Forces the subsequent item to start at the beginning of the string being searched. For example, the expression "^foo" indicates that the search string must start with the prefix "foo".

$ (trailing anchor) Forces the preceding item to end of the string being searched. For example, the expression "foo$" indicates that the search string must end with the suffix "foo".

\x (escape) Forces the next character to be interpreted as a literal character. For example, the expression "\*" represents a literal asterisk (not the greedy asterisk qualifier).

Examples

Here is a simple example of a regular expression that matches a time string in "h:mm" or "hh:mm" military (24-hour) time format: "[012]?[0-9]:[0-5][0-9]". The pattern "[012]?" means zero or one occurrences of a character from the specified set of characters, i.e. zero or one occurrences of the digits "0", "1" or "2". The next pattern "[0-9]" is a character range; in this particular case, the range identifies any character from "0" to "9", i.e. any digit.

The expression "[012]?[0-9]" matches any decimal number with either one or two digits (no minus signs, exponents, decimal points) with the hour values "00" through "29". The ":" character between the two groups is interpreted as a literal character; that is, a colon character must occur between the two group matches. The second expression group, "[0-5][0-9]" matches any decimal number with exactly two digits, where the first character is only allowed to be from "0" to "5" inclusive. Thus, this expression matches minute values from "00" through "59".

While the above regular expression is a syntactically correct definition of a time string, it is not semantically correct in that it allows invalid times such as "25:25". It is possible to rectify this problem using a slightly more complex regular expression: "([01][0-9]|2[0-3]):([0-5][0-9])". Notice that the expression contains several of the same constructs used in the original expression, but also contains more complex constructs such as the parenthesized expressions. Here, the directive "|" in "(x|y)" is used to select either "x" or "y". This example demonstrates how virtually any search semantics can be easily described using regular expressions. However, these examples also demonstrate how easily regular expressions can be incorrectly or inefficiently specified, and how a simple expression can become complex.

Regular Expression Optimizer

Figure 1:
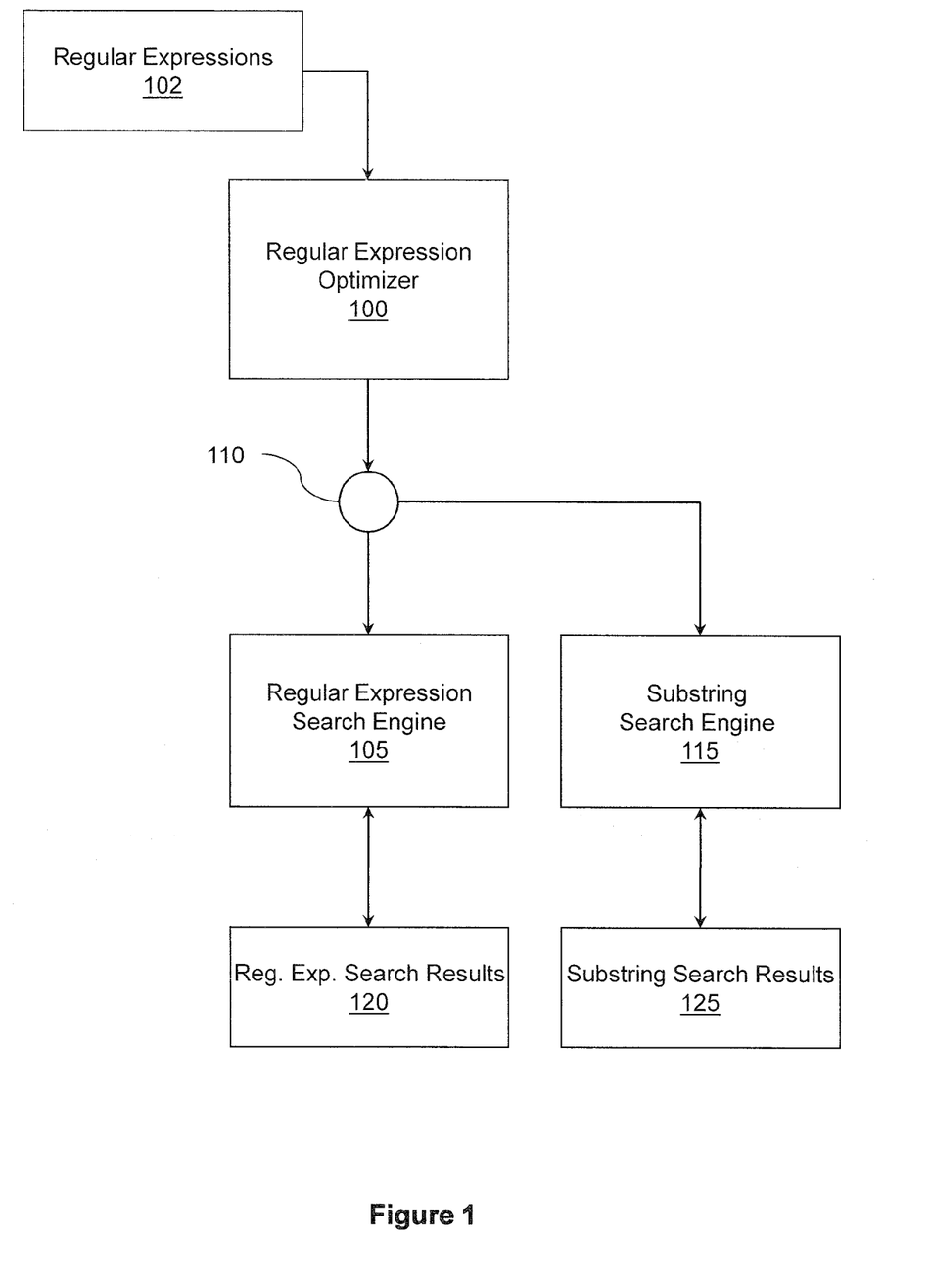
FIG. 1 illustrates one embodiment of a regular expression optimizer.

With reference to FIG. 1, one embodiment of a regular expression optimizer 100 is illustrated that performs pre-processing operations on regular expressions 102. The regular expressions 102 may be user-specified and are to be inputted to a regular expression search engine 105 for processing. The regular expression search engine 105, while processing the regular expressions, consumes CPU cycles, memory, and resources to determine whether the regular expression matches a string a user is searching for. The optimizer 100 is configured to intercept the user-specified regular expressions 102 and attempt to reduce or transform the regular expression to a more efficient form. Some transformations result in the regular expression being eliminated and thus the regular expression search engine 105 is not executed for that rule, which drastically reduces the use of computing resources.

One underlying basis for the regular expression optimizer 100 is that regular expression evaluation is used for filtering data, not actually returning data. That is, the search operation is not concerned with returning an instantiation of the matching object. Rather, a regular expression search operation returns a Boolean result: either the expression matched an object or it did not. This means that replacing one search method with another cheaper method, or transforming an expensive regular expression into a cheaper form, is permissible as long as the subsequent search result is identical or provides equivalent results.

In one embodiment, the regular expression optimizer 100 works when a Boolean result of a "match" is expected. There are two phases for processing regular expressions, an analysis phase and an execution (or search) phase. The optimizer 100 operates during the analysis phase where the regular expressions are analyzed. Execution of the regular expression is then performed. The execution may include one or more sub-phases if applicable: leading prefix substring search, regular expression search, and/or trailing suffix substring search depending on the content of the expression.

In one embodiment, expressions are transformed which might include deletion or alteration of the expression. Alteration includes reduction or addition of patterns.

In one embodiment, the optimizer 100 is implemented with logic or on a non-transitory computer-readable medium and is configured in a computer system that includes at least one processor, a memory, cache memory, a storage device, input/output ports, network communication interfaces, and so on.

In one embodiment, the optimizer 100 analyzes a rule from the user-specified regular expressions 102 and identifies the regular expression within the rule. For example, the optimizer 100 parses and identifies quantifiers that represent characters, syntax, and/or other operators associated with the regular expression language. Non-regular expression characters are identified as substrings to be matched by the rule. Upon identifying the regular expression (in one embodiment), the optimizer 100 modifies/transforms the rule by deleting the regular expression from the rule.

Figure 2:
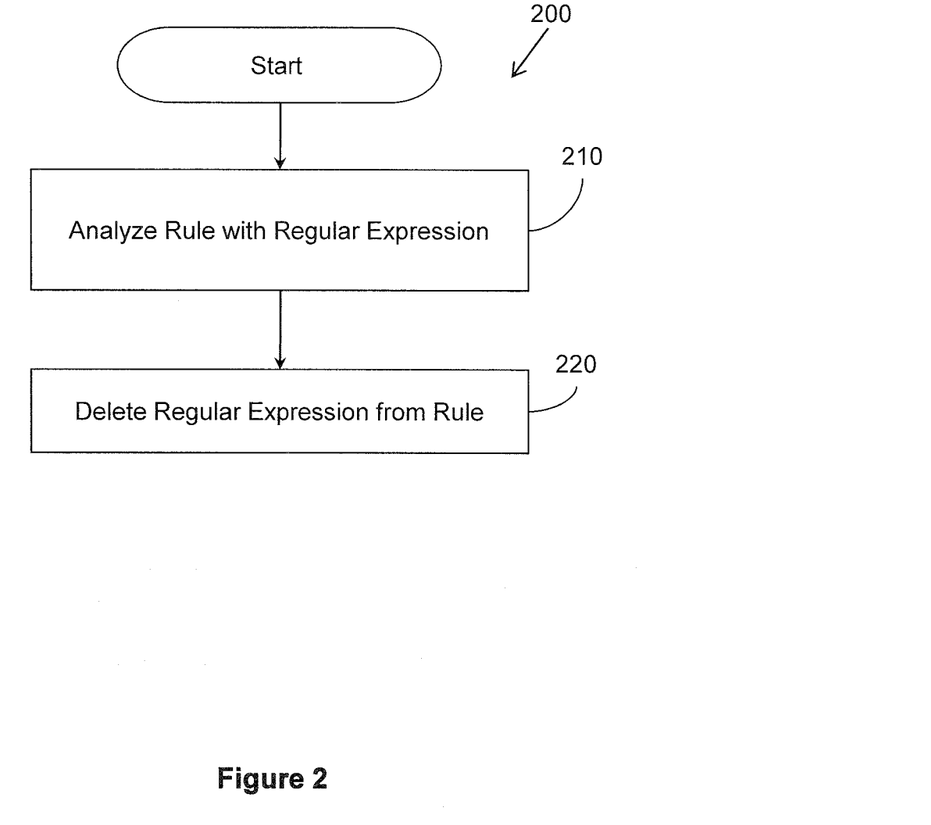
FIG. 2 illustrates one embodiment of a method associated with regular expression transformation.

With reference to FIG. 2, one embodiment of a method 200 is shown associated with the modification/transformation process. At 210, a rule is analyzed to identify its regular expression characters if any. At 220, the regular expression is deleted from the rule.

As a result, the rule no longer includes a regular expression. In one embodiment, transformation rules are implemented that identify when deletions are performed, what types of regular expressions are transformed, and/or under what conditions. Various examples are described below. In some examples, the deleted expression is not replaced. In other examples, the deleted expression is replaced with an alternative expression.

In some situations, the resulting transformed rule may or may not have any regular expressions remaining. The optimizer 100 may include decision logic 110 that determines whether the rule still contains a regular expression. If it does, the rule is sent to the regular expression search engine 105 for processing and results 120 are outputted. If it does not, the rule is not executed by the regular expression search engine 105 but rather is redirected for processing as a substring search to a substring search engine 115, which is a more efficient search. Substring search results 125 are outputted. As stated above, the search engine 105 or 115 performs a matching process and the outputted results are true or false decisions.

In some situations for a single rule, both search engines 105 and 115 are executed for a given expression where the substring search is performed first. If the resulting expression contains both a substring search and a regular expression, the substring search is performed first and then the regular expression is executed because the substring search is much faster. Also if the substring search does not produce a match, then there is no need to perform the regular expression search because it too will not produce a match. If both searches are performed, then the two results are combined. For example depending on the content of the expression, a leading prefix substring search, regular expression search, and/or trailing suffix substring search may be performed. The decision logic 110 is configured to control this processing.

In one embodiment, the results from either search engine 105 or 115 can then be sent to another component for use in other processing. For example, a cache processing logic can use the results to determine what content to store in cache memory based at least in part on the results. For example, content that is retrieved from a data source is cached if the content's filename or web address matches a specified regular expression. Other computer components may also use the results (e.g. a content retrieval component, and so on). A cache system is further described with reference to FIG. 3.

Thus for some regular expressions, the optimizer 100 modifies the rule by deleting some or all of the regular expression quantifiers to transform the rule to a substring search since only one or more substring search quantifiers remain.

In other examples, the modified expression may contain a combination of one or more substring search strings and one or more regular expressions. The substring search strings may be sent for execution to the substring search 110 first and then if necessary, the regular expression portions are sent for execution by the regular expression search engine 105. The results are then combined to generate a final result.

In another embodiment, for the purposes of discussion, consider how a search engine operates if a rule specifies and tries to match the regular expression "x[^x]*+x" against a target string buffer containing the text "xabcx". The "x" pattern matches the initial "x". The "[^x]" pattern matches a, b and c (anything that is not x) as it is repeated by the asterisk. The final "x" pattern then matches the final "x" and results in a successful match. In this case, the end result is the same, whether the rule used a greedy or possessive quantifier. There is a slight performance benefit though, because the possessive quantifier does not have to remember any backtracking positions.

The performance increase can be significant in situations where the regular expression search fails. If the target string is "xabc" (no trailing "x" character), the above matching operation will happen in the same manner, except that the second "x" fails. When using a possessive quantifier, there are no steps to backtrack to. So the match attempt fails immediately when the second "x" fails.

If the original regular expression had used a greedy quantifier instead, the search engine would have backtracked. After the "x" failed at the end of the string, the [^x]* expression would give up one match, leaving it with "ab". The "x" would then fail to match "c". The "[^x]*" expression backtracks to just "a", and "x" fails to match "b". Finally, the expression "[^x]*" backtracks to match zero characters, and "x" fails "a". Only at this point have all backtracking positions been exhausted, and does the engine give up the match attempt. Essentially, this regular expression search performs as many needless steps as there are characters following the unmatched initial "x".

Given this scenario, it is easy to see how powerful yet confusing regular expressions can be. Regular expressions provide customers an easy method for expressing a search pattern. However, the actual search engine processing can be extremely expensive to perform specifically because of the greedy search characteristics of most regular expressions.

The following examples are provided for discussion purposes and not to limit the disclosure in any way. Consider the regular expression "(x+x+)+y". When this expression is applied to the string "xxxxxxxxxxy", the first "x+" matches all 10 x characters. The second "x+" fails. The first "x+" then backtracks to 9 matches, and the second one picks up the remaining "x". The group "(x+x+)" has now matched once. The group repeats, but fails at the first "x+". Since one repetition was sufficient, the group matches. "y" matches "y" and an overall match is found.

However, the above regular expression performs very badly when the "y" is missing from the subject string. When "y" fails, the regular expression search engine backtracks. The group has one iteration that it can backtrack into. The second "x+" matched only one "x", so it cannot backtrack. But the first x+can give up one "x". The second "x+" promptly matches "xx". The group again has one iteration, fails the next one, and the "y" fails. Backtracking again, the second "x+" now has one backtracking position, reducing itself to match "x". The group tries a second iteration. The first "x+" matches but the second is stuck at the end of the string. Backtracking again, the first "x+" in the group's first iteration reduces itself to 7 characters. The second "x+" matches "xxx". Failing "y", the second "x+" is reduced to "xx" and then "x". Now, the group can match a second iteration, with one "x" for each "x+". But this combination fails as well, and continues to backtrack and repeatedly fail.

If this regular expression is tried on a string containing 10 consecutive "x" characters, it takes 2,558 operations to figure out the final "y" is missing. For a string containing 11 consecutive "x" characters, it requires 5,118 operations. For a string containing 12 consecutive "x" characters, it takes 10,238 operations. At 21 consecutive "x" characters, the search engine requires approximately 2.8 million operations.

Users with little regular expression experience are regularly coming up with exponentially complex regular expressions which produce the desired search results, but severely impact system performance (e.g. web cache server performance). Because a web cache is a shared resource, this results in delays in processing other requests. These delays may negatively impact overall customer response time.

In one embodiment, the regular expression optimizer 100 presents a method of intercepting customer-supplied regular expressions and performing systematic pre-processing on these expressions in such a manner that greedy quantifiers can either be completely eliminated or simplified to lazy and/or possessive quantifiers. This optimizer 100 can produce text search operations that reliably provide results either faster or identical to executing the original regular expression. Thus regular expressions that are directed to the regular expression search engine 105 are converted and redirected to the substring search engine 115. This optimization provides for more CPU-efficient search operations, which in turn provides better response time characteristics for the customer.

The input to the regular expression optimizer 100 is a customer-supplied regular expression. The regular expression optimizer 100 pre-processes the supplied regular expression by applying a series of transformation and reduction operations. These operations result in a new expression and a set of operations to be performed on the new expression. These operations may include executing the regular expression search engine, but can also include other operations such as prefix, suffix or substring searches.

In cases where the regular expression can be completely eliminated, the regular expression optimizer 100 executes the resulting operation itself, instead of executing the regular expression search engine. This is one of the methods this system utilizes to achieve performance improvement results.

In one embodiment, the optimizer 100 does not add any new regular expression syntax, nor does it alter any of the generic regular expression language semantics. Rather, it is pre-processing the customer-supplied regular expression intelligently by replacing expressions with equally correct but more efficient alternatives. For example, the regular expression optimizer 100 analyzes an expression to identify two or more regular expression quantifiers. The two or more regular expression quantifiers are deleted and replaced with different quantifiers that produce the same search results but execute more efficiently.

In another example, the regular expression "^.*fooX+.*$" contains three greedy quantifiers, but after a series of reductions can be expressed as a simple substring search for the equivalent pattern "fooX". The search operation can then be performed at a fraction of the computational cost of the original regular expression, using a simple substring search method. Existing regular expression search engines do not have this knowledge about the semantics of the supplied expression and must interpret each greedy quantifier, in isolation, to completion.

Quantitative performance analysis has determined that simple substring searching is consistently faster and less CPU-intensive than regular expression evaluation.

In some cases, a customer-supplied regular expression 102 is completely reduced into an "always true" search result. That is, the supplied regular expression matches everything, and consequently no search is actually required. This is probably indicative of an incorrect regular expression; i.e. this is not what the customer intended. However, the optimization is correct and very efficient. For example, the surprisingly common regular expression "^.*$" always matches every string being searched and requires no actual search operations to return the "matched" result. Consider another surprisingly common regular expression "[0-9]*" (instead of [0-9]+), when customers intend to match a string containing only digits, but end up matching 0 or more digits. Existing regular expression search engines must still process the regular expression, even though such search operations are unnecessary.

In another embodiment, the regular expression optimizer 100 is invoked once per instantiation of a customer-specified regular expression. The cost of performing the optimization is amortized across the number of actual search operations performed. In a web cache, since the web cache process remains active for long periods of time, and customer-specified regular expression are designated in the runtime configuration, the overall reduction in CPU utilization and corresponding decrease in total response time is substantial.

In one embodiment, the regular expression optimizer 100 operates as a one-time operation performed on individual customer-specified regular expressions. The optimization operation analyzes the customer-supplied regular expression and potentially produces a new expression and set of operations that produce identical search semantics, but at a fraction of the cost.

Examples

Expression Transformations

In one embodiment, the regular expression optimizer 100 is configured to perform one or more of the following reductions and/or transformations on regular expressions. Transformation rules can be implemented as stored instructions that represent an algorithm. Various examples are shown for different types/categories of regular expressions. Some examples show various types of greedy quantifiers and simple expressions and how they are transformed. For a particular type of regular expression that appears in a rule or search request, the examples show the resulting string after the original string is transformed. A resulting string of " " is a NULL string and means the regular expression is deleted from the search request. The examples are not intended to be limiting.

1. Anchor Expressions.

In this example, the optimizer 100 identifies and eliminates meaningless search anchors combined with greedy quantifiers, either at the beginning of the pattern or at the end of the pattern. For example:

"^.*foo" becomes "foo" (which is now a substring search)

"foo.*$" becomes "foo" (which is now a substring search)

"^foo[^x]+bar$" becomes the prefix search "foo" followed by the regular expression search "[^x]+" followed by the suffix search "bar".

A large number of anchored-match-all expressions, either leading or trailing, are fairly common. (e.g. "^.*$") This occurs because users do not understand how the regular expression is actually being used by the underlying software. The optimizer 100 detects and eliminates these unnecessary expressions.

Some anchors are invalid anchors. In one embodiment, the optimizer 100 detects and ignores (e.g. treats as ordinary text) invalid anchor characters. Examples include "foo^html", "foo$html", and so on.

2. Zero-or-More Greedy Quantifiers.

In this example, the optimizer 100 identifies and eliminates unnecessary greedy quantifiers that represent a "match anything" pattern. For example:

".*foo" becomes "foo"

"foo.*" becomes "foo"

"fooX*" becomes "foo" (greedy "X*" is completely eliminated)

"foo\?*" becomes "foo"

"foo\\X*" becomes "foo\\"

"fooX*Y*" becomes "foo"

"foo(ab)*" becomes "foo"

"foo[ab]*" becomes "foo"

The greedy operator "*" is another commonly misused expression. The "zero-or-more" expressions can be considered as always-true, so the optimizer 100 eliminates these expressions when possible. In some embodiments, an escaped-asterisk is not a greedy operator and is not eliminated.

3. One-or-More Greedy Quantifiers.

The greedy operator "+" is another commonly misused expression. The "one-or-more" expressions can be considered as always-true if present one time, so the optimizer 100 reduces these expressions to the preceding expression or character. In the example, the optimizer 100 identifies and eliminates unnecessary greedy quantifiers that match at least one character pattern. For example:

"fooX+" becomes "fooX" (which is now a simple substring search)

Note that the expression "fooX" also matches "fooXX" because it contains the specified substring pattern. Again, because the search engine operates to decide on matching a pattern and not returning the actual matching object, the transformed string provides the same matching results.

4. Match-All Quantifiers.

In this example, the optimizer 100 identifies and eliminates unnecessary greedy quantifiers that match anything or nothing. For example:

"^.*$" becomes " " (NULL string implicitly matching everything).

".*" becomes " "

"^.*" becomes " "

".*$" becomes " "

" " becomes " " (this expression is identified and a search is avoided)

In these examples, the regular expression quantifiers are identified and deleted. After transformation, no search is needed because the result is a NULL string. Thus executing the search engine is avoided, which saves processing time and resources.

The use of a match-all expression is common, primarily because the users do not know how to properly indicate their real desires through the regular expression configuration. The optimizer 100 detects various regular expressions that equate to the "match-all" condition, which results in the elimination of any search operation.

5. Wild Cards

A large number of non-anchored-match-all expressions, either leading or trailing, are fairly common. This occurs because users do not understand how the regular expression is actually being used by the underlying software. The optimizer 100 detects and eliminates these unnecessary expressions. Thus a substring search operation is performed instead of executing the regular expression search engine.

".*foo" becomes "foo"

"\.*foo" becomes "foo"

"foo.*" becomes "foo"

6. Leading/Trailing Text.

In this type, the optimizer 100 identifies leading or trailing literal text. For example:

"foo.*bar" becomes the substring "foo" followed by the substring "bar"

The transformation abandons the regular expression search and instead performs two simple substring search operations. The search operation order is preserved in order to provide identical search semantics.

When optimizing leading text, care should be taken for "previous-pattern" metacharacters. For example, "oracl?e" contains the leading text "orac" not "oracl" because the "l?e" is the optional part of the string.

The above transformation eliminates the need to execute the regular expression search engine in favor of using a simple substring search, which is significantly cheaper to execute.

7. Generic Leading Text

The optimizer 100 detects all text before the first regular expression operator as "leading text" and performs a substring search on the leading text first before submitting the remaining regular expression to the regular expression search engine for evaluation. The original form may be a very expensive search operation but the conversion produces two simpler searches. For example:

"foo.*html" becomes "foo"+".*html" (first search substring "foo", then search for regular expression ".*html")

8. Escaped Text: "Escaped Delimiters" Leading Text

In this example, the optimizer 100 identifies escaped regular expression quantifiers that result in ordinary text. For example:

"foo\.html" becomes the ordinary non-regular-expression substring "foo.html"

"foo\*" becomes the ordinary non-regular-expression substring "foo*"

This transformation results in a substring search being performed and avoiding the execution of the regular expression search engine.

To solve this situation in one embodiment, the optimizer 100 detects escaped regular expression delimiters in "leading text". This means that the filename "foo\.html" can be treated as the substring search "foo.html" which is significantly faster than the comparable regular expression search for "foo\.html".

9. "Inadvertent Filenames" Leading Text

"foo.html" becomes "foo.html" (substring pre-search)

In a web cache environment that uses regular expressions to identify URLs, the regular expressions appear as a pseudo-filename e.g. "foo.html". However, this is probably not what the user intended, since the "." in ".html" represents a regular expression delimiter and not simply a dot in a URL. In other words, the expression "foo.html" matches the unexpected "fooXhtml" as well as the expected "foo.html".

To solve this situation in one embodiment, the optimizer 100 detects a "possible" filename regular expression and performs a substring search before attempting a regular expression search. In most cases where a possible filename search is identified, the substring search is significantly faster. In the case of a miss (no match found), the regular expression search is so hugely expensive that the failed substring search "cost" is incidental to the total search "cost".

It will be appreciated that the regular expression optimizer 100 can be implemented to perform one or more of the above transformations, or other combination of transformations.

Other Examples

In one embodiment, the regular expression optimizer 100 is configured to transform inefficient regular expressions to provide more complex expressions that can be processed faster, especially in failure scenarios. For example, suppose the regular-expression "[^x]*x" is searched on a long input string containing only the character "y" repeated many times. This regular expression will fail because the input string does not contain any instances of the character "x". Because the search engine does not know this, it will try to match the expression "[^x]*". Because "*" is a greedy quantifier, it will grab all the characters until the end of the input string, and then it will backtrack, giving back one character at a time in the search for a match.

The expression will fail only when it cannot backtrack anymore, which can take some time, as described above. Worse, because the "[^x]*" grabbed all characters that weren't "x", even backtracking is ultimately useless.

In one embodiment, the regular expression optimizer 100 modifies the expression from "[^x]*x" to "[^x]*+x" using the possessive quantifier "*+". This new expression fails faster because once it has tried to match all the characters that are not "x" it does not need to backtrack; instead it fails right there.

The regular expression optimizer 100 in many cases provides substantial performance improvements by eliminating regular expression processing from the search operation, or substantially simplifying the expression to eliminate greedy quantifiers, or transforming expressions to use lazy or possessive quantifiers. For example, the greedy expression "^/invalidate1/.*$" is transformed to the prefix search string "/invalidate1", which is significantly cheaper and faster to process. In this case, a simple prefix string search is executed instead of executing the regular expression search engine.

The regular expression optimizer 100 is portable and can be used with any search engine, on any platform. Further, this optimizer 100 can change optimization strategies for specific search engines to provide the best possible search performance characteristics.

Some regular expression search engines consume large amounts of memory during the actual search operations. Eliminating the need to execute the search engine means more memory resources are available for other computer system requirements.

In another embodiment, the regular expression optimizer 100 is configured to detect and warn customers about potentially incorrect or inefficient regular expressions. For example, expressions that are semantically "always true" are probably not what the customer intended and the optimizer 100 identifies this type of regular expression and provides a notice and/or other diagnostic information.

Examples

Expression Execution

After the regular expression is transformed, the transformed rule may be processed differently. The following examples show various ways that particular types of expressions are executed.

1. "Leading Text Substring"

If an expression contains leading text, the optimizer 100 executes a fast substring search using this text first. If a match is not found, the regular expression fails and further search is not needed. If a match is found, the source string is advanced by the size of the substring search string past the identified matching string and the regular expression pattern search operation is then performed on the remaining source string.

2. "Filename Substring"

If a possible filename search is detected by the optimizer 100, a substring search is first performed using the regular expression as a simple text string. For example, the regular expression "foo.html" can be used as a simple substring search to find the filename "foo.html". If a match is found, the regular expression succeeds. If a match is not found, the search is sent to the regular expression search engine to perform a normal regular expression pattern search operation.

3. Regular Expression Execution

If a regular expression is not transformed or reduced in any way, it is sent to the regular expression search engine to perform a normal regular expression pattern search operation.

Figure 3:
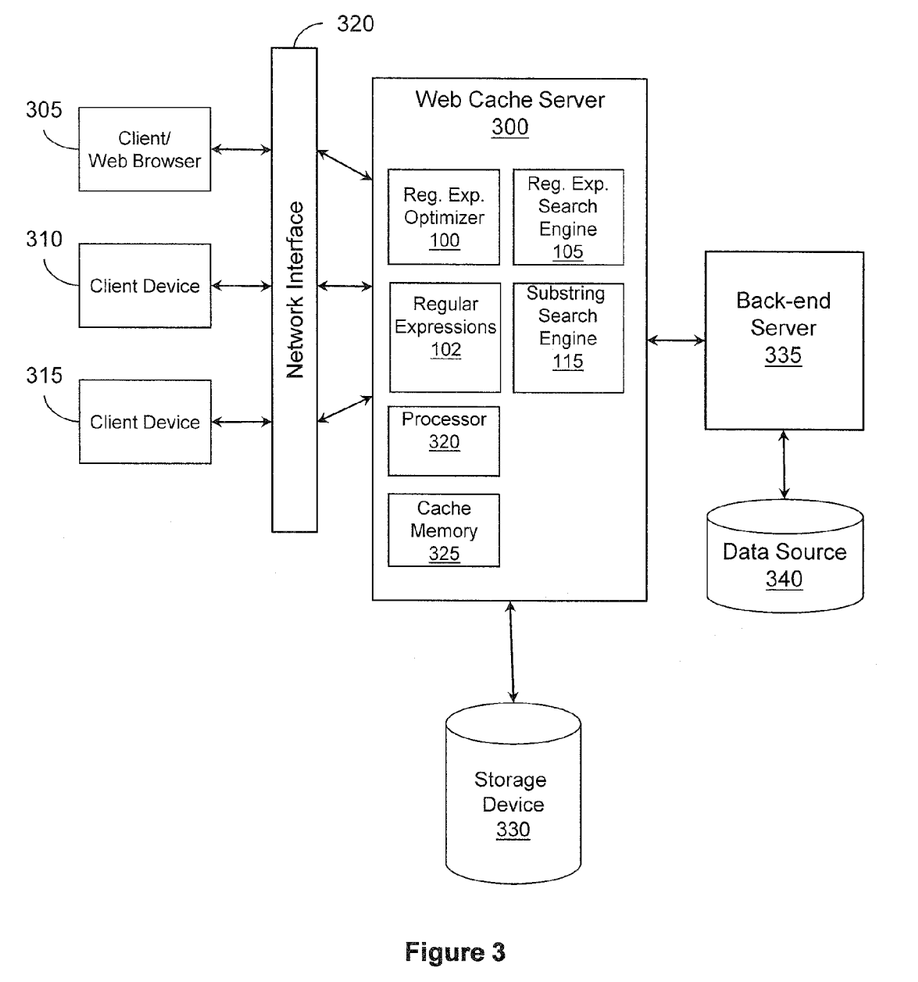
FIG. 3 illustrates one embodiment associated with a cache server.

With reference to FIG. 3, one embodiment of a web cache 300 is shown that is implemented with the regular expression optimizer 100 from FIG. 1. In one embodiment, the web cache 300 is a computing/network server that provides reverse proxy cache deployed between a requesting device and a content source. The web cache 300 includes at least a processor 320 and cache memory 325, and/or a storage device 330. One purpose of the web cache 300 is to improve the performance of web sites by caching frequently accessed content. For example, the requesting device may be a client using a browser 305 or other client-side device (310, 315) that communicates via a network interface 320 of the cache server 300. The content source can include a back-end server 335 (e.g. an HTTP server, a content management server), and/or other data sources 340 (e.g. data bases, web pages, files, and so on).

In one embodiment, the regular expressions 102 are used to define what content is to be cached by the web cache 300. Based on matches found by the regular expression search engine 105, matched objects are cached in the cache memory 325. The regular expression optimizer 100 pre-processes the regular expressions 102 and transforms one or more of them as described above. Thus for some regular expressions 102, execution of the regular expression search engine 105 is avoided and instead a substring search is performed.

While the disclosure describes (and figures illustrate) various actions occurring in serial, it is to be appreciated that various actions could occur substantially in parallel and/or in other orders. While a certain number of processes are described, it is to be appreciated that a greater and/or lesser number of processes could be employed. Moreover, less than all the illustrated blocks may be used to implement an example methodology. Blocks may be combined or separated into multiple components. Furthermore, additional and/or alternative methodologies can employ additional, not illustrated blocks.

In one embodiment, the described systems, methods and/or their equivalents may be implemented with computer executable instructions. Thus, in one embodiment, a non-transitory computer-readable medium is configured with stored computer executable instructions that if executed by a machine (e.g., processor) cause the machine (and associated components) to perform the method.

While example systems, methods, and so on have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer including at least a processor, cause the computer to:
   perform systematic processing, by at least the processor, of rules that have been submitted for execution, wherein the systematic processing comprises:
      analyzing, by at least the processor, one or more of the rules by parsing the one or more rules to identify one or more regular expression quantifiers and one or more substring search quantifiers within the one or more rules; and
      in response to identifying the one or more regular expression quantifiers within the one or more rules, modifying, by at least the processor, the one or more rules by deleting one or more of the regular expression quantifiers from the one or more rules to transform the one or more rules to a substring search based on at least the one or more substring search quantifiers that does not contain a regular expression; and
   execute the one or more rules after the one or more rules are modified.

2. The non-transitory computer-readable medium of claim 1, where the instructions for analyzing comprise: instructions that when executed by the processor cause the computer to determine that at least one of the regular expression quantifiers is a greedy quantifier; and
   where the instructions for deleting comprise instructions that when executed by the processor cause the computer to delete the greedy quantifier and replace the greedy quantifier with a lazy quantifier or a possessive quantifier.

3. The non-transitory computer-readable medium of claim 1, where the instructions for analyzing comprise: instructions that when executed by the processor cause the computer to determine that at least one of the regular expression quantifiers is a quantifier being a match-all quantifier, an anchor quantifier, a wild card quantifier, or a zero-or-more quantifier; and
   where the instructions for deleting comprise instructions that when executed by the processor cause the computer to delete the quantifier where only a substring remains in the rule.

4. The non-transitory computer-readable medium of claim 1, where the instructions for analyzing comprises: instructions that when executed by the processor cause the computer to detect an escaped regular expression delimiter in leading text of a filename; and
   remove the escaped regular expression delimiter from the filename where only the filename is searched as a substring search.

5. The non-transitory computer-readable medium of claim 1, further comprising instructions that when executed by the processor cause the computer to:
   determine whether the modified rule includes a remaining regular expression; and
   when no regular expression remains in the modified rule, then divert the modified rule from being executed by a regular expression search engine and executing the modified rule with a substring search engine.

6. A non-transitory computer-readable medium storing computer-executable instructions that when executed by a computer cause the computer to process rules inputted to a search engine for execution by:
   for a rule that has been inputted for execution to the search engine, parsing and analyzing the rule, by the computer, to identify regular expressions in the rule by at least identifying characters that represent one or more regular expression quantifiers and one or more substring search quantifiers within the rule, where the rule is to be executed by a regular expression search engine if the rule contains a regular expression; and
   in response to identifying the one or more regular expression quantifiers in the rule, transforming the rule, by the computer, by modifying the rule by deleting one or more of the regular expression quantifiers identified in the rule to transform the rule to a substring search based on at least the one or more substring search quantifiers that does not contain a regular expression to avoid execution of the transformed rule by the regular expression search engine causing the transformed rule to be executed by a substring search engine.

7. The non-transitory computer-readable medium of claim 6, wherein the rules define expressions for matching string patterns in target objects, wherein after the rule is executed, when a match is found by the substring search engine, then remaining strings in the rule are executed by the regular expression search engine to determine additional pattern matches.

8. The non-transitory computer-readable medium of claim 6, where the instructions for modifying the rule include instructions that when executed by the processor cause the processor to:
   identify an anchor quantifier as the regular expression quantifier in the rule and delete the anchor quantifier from the rule.

9. The non-transitory computer-readable medium of claim 6, where the instructions for modifying the rule include instructions that when executed by the processor cause the processor to:
   identify a zero-or more greedy quantifier as the regular expression quantifier in the rule and delete the zero-or more greedy quantifier from the rule.

10. The non-transitory computer-readable medium of claim 6, where the instructions for modifying the rule include instructions that when executed by the processor cause the processor to:
    identify a one-or-more greedy quantifier as the regular expression quantifier in the rule and delete the one-or-more greedy quantifier from the rule.

11. The non-transitory computer-readable medium of claim 6, where the instructions for modifying the rule include instructions that when executed by the processor cause the processor to:
    identify a match-all quantifier as the regular expression quantifier in the rule and delete the match-all quantifier from the rule.

12. The non-transitory computer-readable medium of claim 6, where the instructions for modifying the rule include instructions that when executed by the processor cause the processor to:
    identify leading text and trailing text in the regular expression; and
    convert the regular expression into two substrings from the leading text and trailing text and perform substring searches without executing a regular expression search using the regular expression search engine.

13. The non-transitory computer-readable medium of claim 6, where the instructions for modifying the rule include instructions that when executed by the processor cause the processor to:

identify a wild card quantifier as the regular expression quantifier in the rule and delete the wild card quantifier from the rule.

14. The non-transitory computer-readable medium of claim 6, further comprising instructions that when executed by the processor cause the processor to:
determine whether the modified rule causes a match with a string from an object; and
when a match is found, caching the object in a cache memory.

15. A computer-implemented method implemented by a computer including at least one processor that executes a search engine, the method comprising:
receiving input to the search engine wherein the input includes one or more rules that have been submitted to the search engine for execution, wherein the one or more rules define expressions for matching string patterns in target objects;
after receiving the one or more rules for execution and prior to execution:
(i) analyzing the one or more rules systematically, by at least the processor of the computer, to identify regular expressions within the rules by parsing characters within the rules to identify one or more regular expression quantifiers and one or more substring search quantifiers within the one or more rules; and
(ii) for the one or more rules in which a regular expression is identified, modifying one or more of the rules, by at least the processor of the computer, by deleting one or more of the regular expression quantifiers from the rules to transform the one or more rules to a substring search based on at least the one or more substring search quantifiers that does not contain a regular expression to avoid execution of the regular expression which causes a reduction in processor utilization when the modified rules are executed; and
executing, by at least the processor, the one or more rules after the rules are modified.

16. The computer-implemented method of claim 15, where the analyzing comprises: determining that at least one of the regular expression quantifiers is a greedy quantifier; and
where the deleting comprises deleting the greedy quantifier and replacing the greedy quantifier with a lazy quantifier or a possessive quantifier.

17. The computer-implemented method of claim 15, where the analyzing comprises: identifying two or more regular expression quantifiers; and
where the deleting comprises replacing the two or more regular expression quantifiers with different quantifiers that produce the same search results.

18. The computer-implemented method of claim 15, further comprising: intercepting the rules after the rules are submitted for execution by a user, wherein the analyzing is performed after the intercepting.

* * * * *

UNITED STATES PATENT AND TRADEMARK OFFICE
CERTIFICATE OF CORRECTION

PATENT NO. : 9,507,880 B2  
APPLICATION NO. : 12/857636  
DATED : November 29, 2016  
INVENTOR(S) : Thilagar et al.

Page 1 of 1

It is certified that error appears in the above-identified patent and that said Letters Patent is hereby corrected as shown below:

In the Specification

In Column 7, Lines 28-34, delete "In other examples, the modified expression may contain a combination of one or more substring search strings and one or more regular expressions. The substring search strings may be sent for execution to the substring search 110 first and then if necessary, the regular expression portions are sent for execution by the regular expression search engine 105. The results are then combined to generate a final result." and insert the same on Column 7, Line 27, as a continuation of the same paragraph.

In Column 8, Line 21, delete "x+can" and insert -- x+ can --, therefor.

In the Claims

In Column 16, Line 37, in Claim 9, delete "zero-or more" and insert -- zero-or-more --, therefor.

In Column 16, Lines 38-39, in Claim 9, delete "zero-or more" and insert -- zero-or-more --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*